United States Patent [19]

Juneja

[11] 3,887,511

[45] June 3, 1975

[54] UREA-HCHO-DICYNDIAMIDE-OXY ACID OF PHOSPHORUS FIRE-RETARDANT FORMULATION AND PRODUCTS

[75] Inventor: Subhash C. Juneja, Ottawa, Ontario, Canada

[73] Assignee: Canadian Patents and Development Limited, Ottawa, Ontario, Canada

[22] Filed: Nov. 30, 1972

[21] Appl. No.: 310,958

[30] Foreign Application Priority Data

Feb. 2, 1972 Canada.................................. 133797

[52] U.S. Cl......... 260/29.4 R; 117/136; 117/143 A; 117/148; 117/155 L; 117/161 LN; 161/259; 161/261; 260/69 N; 260/70 R; 260/71
[51] Int. Cl..... C08g 37/28; C08g 51/24; C08g 9/14
[58] Field of Search...... 260/69 N, 69 R, 71, 29.4 R

[56] References Cited
UNITED STATES PATENTS

| | | | |
|---|---|---|---|
| 2,482,756 | 9/1949 | Ford et al. ..................... | 260/69 N X |
| 2,582,961 | 1/1952 | Burnell et al. ............. | 260/67.6 R X |
| 2,628,946 | 2/1953 | Juda et al. .................... | 260/69 N X |
| 3,372,131 | 5/1968 | Rohifs et al................... | 260/69 N X |
| 3,479,211 | 11/1969 | Goldstein........................... | 117/136 |

*Primary Examiner*—Howard E. Schain
*Attorney, Agent, or Firm*—Alan A. Thomson

[57] ABSTRACT

A stable fire-retardant formulation for use on wood and other cellulosic products is formed from a urea (about 1–10 moles) and dicyandiamide (about 1–11 moles) partially reacted in aqueous solution of pH about 7.5 to 9 with formaldehyde at from about 60° to 90°C until a clear solution is obtained. This incompletely-reacted clear solution is cooled to below 50°C preferably about 25° to 35°C and mixed with an oxyacid of phosphorus to give a formulation suitable for impregnation and having a long storage-or pot-life. The amount of formaldehyde should be about 1.2 to 3 moles and the amount of the P acid from about 0.5 to 2 moles, both per mole of urea plus dicyandiamide.

The resin can be cured and insolubilized by heating to about 50°–110°C e.g. in situ in the cellulosic product. The product has leach resistant flame-retardancy, glow and decay resistance, and is non-blooming. The natural appearance of wood is not altered by the treatment.

12 Claims, No Drawings

UREA-HCHO-DICYNDIAMIDE-OXY ACID OF PHOSPHORUS FIRE-RETARDANT FORMULATION AND PRODUCTS

This invention is concerned with aqueous solutions of incompletely-reacted urea compounds, dicyandiamide, formaldehyde and an oxy-acid of phosphorus, the solutions having prolonged stability at ambient temperatures and being useful in forming coatings, impregnated substrates, adhesives and resins particularly for the treatment of wood and cellulosic products to render them fire-retardant and resistant to decay. A method of preparing the solutions to assure incomplete reaction and much prolonged stability is an important part of the invention.

The invention was developed to provide a stable and leach-resistant fire-retardant formulation which:

i. is sufficiently effective to meet the Underwriter's Laboratories specifications for "Class C" Roof Coverings (ASTM E-108), when applied to Western Red Cedar shingles and shakes.

ii. is leach resistant to the action of cold water.

iii. shows a wide application latitude e.g. stability (pot-life) of over one month, a wide range of solids content etc.

iv. can be used effectively an an impregnant, an adhesive for binding panel products, and for the surface treatment of wood products.

v. is suitable for the production of natural-looking interior decorative fire-retardant hardwood plywood, as well as other types of plywoods.

vi. is applicable as adhesive for the production of fire-retardant particle and fibre boards.

vii. renders the treated materials flame, glow, and decay resistant.

viii. can also be used for the treatment of other cellulosic materials for flame, glow and decay resistance, while not affecting the natural appearance of various materials after application.

ix. is economical to permit the treated materials to compete with other products.

The various known means of obtaining fire-retardancy such as the use of inorganic salts and organic compounds containing nitrogen, phosphorus, and halogens present several disadvantages. For example, products treated with inorganic salts exhibit drawbacks such as significant leachability and surface blooming, thus making some of these products unsuitable for interior decorative and exterior use. Certain leach resistant fire-retardant systems such as those involving the use of tetrakis-(hydroxy methyl)-phosphonium chloride, and tris-(1-aziridinyl)-phosphine oxide are not economically acceptable due to their prohibitive costs. Those based upon modified melamines show a limited pot-life at room temperature, thus making refrigeration frequently necessary for their use in industrial practice for the impregnation treatment of wood. Dicyandiamide, formaldehyde and phosphoric acid have been combined for fire-retardant use but the compositions were unsuitable for adhesive or coating use, and the pot-life and leach resistance were limited. The bromination process as disclosed by Lewin U.S. Pat. No. 3,150,919 (1964) does not provide sufficient protection against glowing.

Urea-formaldehyde resin aqueous solutions or dispersions have been prepared but in order to obtain even limited stability the pH must be adjusted to the alkaline side (these solutions flocculate at acid pH) and the solids content controlled to about 60–75 percent. Multi-component urea-aldehyde resins have been used as fire-retardants (may contain boron or phosphorus in some form) but apparent disadvantages include one or more of: high cost of at least one component, poor water-solubility before application, poor aqueous solution stability or pot-life, limited range of solids contents restricting application, inadequate fire-retardancy, or drastic alteration in surface appearance of treated article. When pre-reacted methylol-urea is incorporated, clear aqueous solutions of adequate stability or pot-life have not been prepared.

The present invention provides highly stable aqueous compositions comprising an incomplete reaction product of a. a urea
b. dicyandiamide
c. formaldehyde
and d. oxy-acid of phosphorus in the following relative amounts a. about 1 to 10 moles
b. about 1 to 11 moles
c. about 1.2 to 3 moles per mole of (a) plus (b)
and d. about 0.5 to 2 moles per mole of (a) plus (b)

with unreacted or excess formaldehyde being present. These relative amounts are critical to obtain a clear solution which will not discolour the treated products and which has the prolonged pot-life.

A mixture of the urea and dicyandiamide is contacted with an aqueous solution of formaldehyde at a temperature of about 60°–90°C (preferably about 70°–80°C) and a pH of about 7.5 to 9 (preferably about 8). The temperature is maintained until a clear solution is obtained and then cooled to below 50°C preferably to 25°–35°C. The cooled solution is then mixed with the oxy-acid of phosphorus added at a rate which will not cause a violent reaction or drastic rise in temperature. The solutions are water-dilutable or can be concentrated under vacuum to the desired solids content. By adding water to accelerate the cooling, adjustment can be made in the solids content as well.

These resinous solutions are highly effective for bestowing to substrates leach resistant flame-retardancy, glow and decay resistance without blooming. Various methods of treating substrate or of use are:

Impregnation techniques: e.g. (1) Soaking (2) Diffusion into green wood (3) Pressure impregnation (4) Microwave heating of green wood followed by dipping in cold solution (5) Transverse compression (6) Dip treatments with exposure to ultrasonic waves.

Surface applications: e.g. by brush, spray, roller coating etc.

Adhesives: e.g. for binding panel products, laminates, reinforced composites etc.

Wood and wood product substrates can be shingles, shakes, planks, boards, or any other planed, sawed or split, veneered, shredded wood or lumber product; or any other material made from the molding or forming by any technique of ground, shredded, veneered, splintered or otherwise cut-up, pieces of wood.

Other materials such as textiles, paper etc. can also be treated with these aqueous solutions.

The wood products can be treated to a wide range of effective percent retentions. The percent retention would vary according to the following factors: degree of fire-retardancy desired, type and quantities of acidic components used, and the nature of the material to be treated. Evaluation by standard tests, well known in the art such as ASTM E-84-61, ASTM E-286-65T, ASTM E-108, B.S. 476 etc, will teach the optimum amount of retentions to be used in a given case. Generally about 10 to about 50 percent or more by wt. is suitable for most materials. The treated materials are cured after the desired level of retention is achieved. Curing can be accomplished by heating the treated materials to about 50° to 110°C e.g. in a convection oven or by pressing in a hot press at a suitable temperature and pressure, depending upon the nature of the wood products and the composition of the treating solution used. Optimum conditions can be easily determined for a particular system.

The resin composition of this invention can also be used as a thermosetting adhesive for making plywood, particle board and other wood materials which are molded or formed from pieces of wood.

For urea itself, urea compounds can be substituted in whole or in part e.g. thiourea, and neutral salts thereof.

The oxy-acid of phosphorus is suitably orthophosphoric acid ($H_3PO_4$ or $2H_3PO_4 \cdot H_2O$) but others such as $H_4P_2O_7$, $H_4P_2O_6$, $HPO_3$ and the polyphosphoric acids and mixtures thereof may be used. A minor amount of acids such as HCl, $HBO_3$, HBr, $H_3SbO_4$, $H_3AsO_4$, $H_2SO_4$, trichloroacetic acid etc. may be substituted for part of the P acid in some uses. The other acid used should desirably bestow some fire-retardant properties.

The resin solution may optionally contain acidic salts such as ammonium phosphates and phosphites, ammonium halides and ammonium sulphates. For special applications other wood preservatives, corrosion inhibitors, dispersants or surfactants may be incorporated. Compounds of common transition elements can be added for special effects such as increased resistance to weathering and other environmental factors.

In adhesive applications where a fast cure-rate is important the stable solutions can be modified just before use by the addition of a small amount up to about 5 percent (by wt. of total solids) of a soluble polyfunctional amine or amide such as urea, thiourea, dicyandiamide, guanidine, acetamide etc. (or of a catalyst e.g. Zn). The pot-life was drastically reduced and the cure-rate increased by this measure. Formaldehyde fumes generated when using the solutions as adhesives during the preparation of particle board would be reduced by this technique (except with catalyst).

EXAMPLE 1

A number of samples of the treating solutions were made according to this invention, each sample varying from the others in its chemical composition. These typical compositions and the corresponding solution stabilities (Pot-Life) are shown in Table I. The method of preparation of the solutions was as follows:

1. 37 percent aqueous formaldehyde solution was added to a reactor vessel and its pH was adjusted to about 8 with NaOH. (This solution could be further diluted with water depending upon the solids concentration desired in the final solution). Then it was heated to 80°C.
2. Pre-mixed urea and dicyandiamide were added to the above solution with constant stirring until dissolved. Further heating was stopped and the solution was allowed to cool from about 80°C.
3. When the above solution reached a temperature of about 35°C, it was mixed with phosphoric acid slowly.

The product which resulted by following the above steps was in the form of a clear solution and could be further diluted with water or concentrated under vacuum to obtain the desired solids content depending upon the nature of application. In this manner, solutions having concentrations of up to about 70 percent or more can be prepared. Depending on the solids content and amount of acid, the initial pH on addition of the P acid is usually below about 3 for most prolonged stability or pot-life. The solutions having mole ratios of about 3 to 1 of urea to dicyandiamide show a longer pot-life at a concentration of 40 percent solids or higher than those with a lower solids concentration. Therefore the solutions corresponding to this composition should preferably be prepared and stored with at least 40 percent concentration.

TABLE I

COMPOSITION AND STABILITIES OF FIRE RETARDANT SOLUTIONS

| Solution No. | MOLAR COMPOSITION | | | | MOLE RATIOS | | Solution Concentration wt.% | Pot-Life (weeks unless indicated otherwise) |
| | Urea (a) | Dicyandiamide (b) | Formaldehyde (c) | $H_3PO_4$ (d) | c / (a+b) | d / (a+b) | | |
| --- | --- | --- | --- | --- | --- | --- | --- | --- |
| 1. | 1 | 1 | 4 | 2 | 2 | 1 | 48.4 | >75. |
| 2. | 1 | 3 | 6 | 2 | 1.5 | 0.5 | 54.1 | <26. |
| 3. | 1 | 3 | 6 | 4 | 1.5 | 1 | 59.4 | >75. |
| 4. | 1 | 3 | 8 | 4 | 2 | 1 | 20.4 | >75. |
| 5. | 1 | 3 | 8 | 4 | 2 | 1 | 46.7 | >75. |
| 6. | 1 | 3 | 12 | 4 | 3 | 1 | 52.6 | >40. |
| 7. | 1 | 1.5 | 3.75 | 2.5 | 1.5 | 1 | 59.8 | >80. |
| 8. | 1 | 1.5 | 3.75 | 1.25 | 1.67 | 0.5 | 55.0 | ≅26. |
| 9. | 3 | 1 | 8 | 3 | 2 | 0.75 | 63.4 | >26. |
| 10. | 1 | 3 | 8 | 4 | 2 | 1 | 66.4 | ≅22. |
| 11. | 1 | 3 | 8 | 4 | 2 | 1 | 33.2 | >56. |
| 12. | 10 | 1 | 22 | 13.5 | 2 | 1.23 | 66.3 | ≅6. |

As the mole ratio of urea to dicyandiamide in the urea-dicyandiamide mixture is increased above about 3 the pot-life gradually declines, but at a mole ratio of 10 is still over 1 month. The proportion of dicyandiamide to urea can be increased above about 3 (mole ratio) with little effect on pot-life. With the higher proportions of dicyandiamide the exothermic reaction heat is increased and more precautions are necessary.

Additional treating solutions were made up using different amounts of reactants within the operative limits, and adding other acids or other components during preparation. The other acids were most suitably added along with the P acid, while the bases or salts could be added earlier when the pH was higher. Results are summarized in Table 1A.

Solution No. 19 contained no phosphoric acid and the stablity was only about three weeks (at about 40 percent solids content). Solution No. 21 was quite unstable presumably due to the zinc having some catalytic effect. Solution No. 22 containing less zinc chloride than No. 21 was still relatively unstable. Such metal halides could be added just before application to accelerate the cure and bestow some additional fire-retardancy.

EXAMPLE 2

Leach Resistant Fire-Retardancy of Cedar Shingles

Western Red Cedar shingles were arranged in a pressure treating vessel by spacing them with 1/26 inch thick veneer strip. These were then covered with the solution having a molar composition corresponding to solution No. 3 (Table I). This was obtained by diluting solution No. 3 with water to a concentration of 24.7 percent. Impregnation was achieved by evacuating the impregnating vessel and its contents for 30 minutes at 26 inch of Hg. followed by a 1 hour pressure period of 100 psi at room temperature. The shingles so treated were drained of excess solution and cured in a convection oven for 10 hours at 60°C. followed by a further heating period of 2 hours at 105°C. The treated shingles with a percent retention range of 21–32 were divided into two groups for evaluation. Retentions were expressed on the oven-dry weight basis of the untreated products. This notation is used through-out.

One group of the treated shingles was subjected to the leaching action of cold water. This was carried out by submerging the treated shingles under water and the water was changed at a rate of 7 litres per minute for a period of 7 days. During the process of leaching, the water in the tank was continuously stirred. Before and after leaching, the shingles were conditioned in a 35 percent R.H. chamber at 80°F followed by testing in a 2-foot modified Monsanto tunnel furnace. The flame spread index relative to 5/16 inch thick red oak, taken as 100 and asbestos cement as zero was determined. Before leaching the average flame spread index range was 25–32 while after leaching it was 30–35. No afterglow was observed in the either case. Compared to this, the untreated control samples showed an average flame spread index of over 100 and an afterglow of up to 30 seconds by the 2-foot tunnel method.

EXAMPLE 3

Evaluation of Treated Cedar Shingles According to Test Method ASTM E-108

Red Cedar shingles were pressure impregnated according to the method of Example 2, but in this case the solution No. 4 (Table I) without any further dilution or evaporation was used. The concentration of this solution was 20.4 percent.

The performance of the treated shingles was determined by the three standard tests (ASTM E-108) for roof coverings, a flame exposure test, a spread of flame test and a resistance to burning brand test.

During the flame exposure test, no flaming occurred on either the shingle surface or the underside of the test decks. After-glow was completely absent and an intumescence of up to ⅜ inch thick was observed.

The shingle deck after the spread of flame test showed a four foot arc of charring to about the eighth row of a 30-row deck. No surface or underside flaming was observed during this test. After-glow of the shingle deck was completely absent as in the previous test.

TABLE IA

COMPOSITION AND STABILITIES OF FIRE RETARDANT SOLUTIONS

| Solution No. | MOLAR COMPOSITION | | | ACIDS (d) | | | | MOLE RATIOS | | Solution Concentration wt.% | Pot-life (weeks unless indicated otherwise) |
|---|---|---|---|---|---|---|---|---|---|---|---|
| | Urea (a) | Dicy-andiamide (b) | HCHO (c) | $H_3PO_4$ | HCl | $H_2SO_4$ | Other Components | $\frac{c}{a+b}$ | $\frac{d}{a+b}$ | | |
| 13. | 1 | 3 | 8 | 2 | 2 | — | — | 2 | 1 | 59.7 | >56. |
| 14. | 1 | 3 | 8 | 2 | — | 2 | — | 2 | 1 | 67.7 | ≅30. |
| 15. | 1 | 3 | 8 | 2 | 2 | — | — | 2 | 1 | ~37.8 | ≅22. |
| 16. | 1 | 3 | 8 | 2 | — | 2 | — | 2 | 1 | 37.6 | >56. |
| 17. | 1 | 3 | 8 | 6 | — | — | 0.48 $NH_4OH$ | 2 | 1.5 | 67.5 | ≅54. |
| 18. | 1 | 3 | 8 | 6 | — | — | 0.71 $NH_4OH$ | 2 | 1.5 | 66.9 | >58. |
| 19. | 1 | 3 | 8 | — | — | — | 3.05 $NH_4H_2PO_4$ | 2 | — | 40.5 | ≅3. |
| 20. | 1 | 3 | 8 | 4 | — | — | 3.45 $NH_4H_2PO_4$ | 2 | 1 | 41.4 | >20 |
| 21. | 1 | 3 | 8 | 4 | — | — | 3.39 $Zn\,Cl_2 \cdot 6H_2O$ | 2 | 1 | 48.3 | <12 hr. |
| 22. | 1 | 3 | 8 | 4 | — | — | 1.83 $Zn\,Cl_2 \cdot 6H_2O$ | 2 | 1 | 42.3 | <5 days |

In the resistance to burning brand test, no flaming of the deck boards was noted during or after the test period. There was no ignition of the decks at all and afterglow was completely absent. Signs of charring did not penetrate the deck.

Therefore according to these tests, the shingles treated by this method would meet the "Class C" requirements of the Underwriter's Laboratories Inc. before leaching. Further tests on these shingles have shown no significant difference in performance after water leaching according to the "permanence of treatment test" in the "Class C" spread of flame, intermittent flame exposure, and resistance to burning brand tests — thereby meeting the "Class C" requirements of the Underwriter's Laboratory Inc.

It has been reported that when western red cedar is treated with some of the existing formulations, the treated products become dark and unsightly or give the appearance of being seriously weathered. On the other hand, western red cedar treated with this formulation showed no adverse effects in appearance.

EXAMPLE 4

Preparation of Interior Decorative Hardwood Plywood By Pressure Impregnation

Dry birch veneers of dimensions 34 × 16 × 1/26 inches and basswood veneers of dimensions 34 × 16 × 1/6 inches were arranged in a copper tank lined with a polyethylene sheet. The veneers were separated with 1/26 inch thick strips and covered with the fire-retardant solution No. 4 (Table I) of solids content 20.4 percent.

The tank and its contents were evacuated for 30 minutes at 26 inches of Hg followed by the application of a pressure of 100 p.s.i. for 1 hour. The veneers so treated were drained and then dried in a forced-air convection oven for 2½ hours at 105°C. The total fire-retardant retentions obtained were 18.9 and 34.6 percent of the oven-dried weight of the birch and basswood veneers respectively. These were then assembled into a three ply plywood by using a urea-formaldehyde adhesive. The appearance of the plywood was not adversely affected by this treatment. The plywood panels were tested by the 8-foot tunnel furnace according to the ASTM standard E-286-65T. A flame spread index of 23 was obtained by this test.

EXAMPLE 5

Preparation of Fire-Retardant Panel Products by Surface Application

A fire-retardant solution having a molar composition corresponding to solution No. 5 (Table I) was applied by brush to one surface of various substrates as indicated in Table II. The coated panels were cured in one of the following ways.

a. Convection Drying:
  The coated panels were heated in a forced air convection oven for about 48 hours at 60°C.
b. Dry Fusion:
  The coated panels were air dried followed by pressing in a hot press at about 335°F and 250 p.s.i. for approximately 45 seconds.
c. Wet Fusion:
  Immediately after coating, the panels were wrapped in an aluminum foil and pressed in a hot press maintained at 235°F and 250 p.s.i. for a period of 3 minutes.

The panels treated by the above methods were conditioned in a 35 percent R.H. atmosphere at 80°F followed by testing in the 2-foot modified Monsanto tunnel furnace. The flame spread indices obtained are as shown in Table II. The treated panels had a clear surface finish and showed up to ½ inch thick intumescence when tested by the 2-foot tunnel method.

Table II

Surface Treatment Methods and Flame Spread Indices of Treated Products

| Solution Concentration Wt. % | Method | Substrate | Wet Coverage (g/sq. ft.) | Flame Spread Index (2-foot tunnel) |
| --- | --- | --- | --- | --- |
| 55.3 (Solution No. 5) | 1. Convection Drying | 3/16" Yellow Birch Plywood | 74 | 33 |
|  |  | 3/16" Lauan Plywood | 80 | 25 |
|  |  | ½" Red Cedar Particle board | 77 | 28 |
|  | 2. Dry Fusion | 3/16" Yellow Birch Plywood | 65 | 45 |
|  |  | 3/16" Lauan Plywood | 55 | 51 |
| 66.5 (Solution No.5) | 3. Wet Fusion | 3/16" Yellow Birch Plywood | 32 | 45 |

EXAMPLE 6

Adhesive Applications of Wooden Flakes for Preparing Fire-Retardant Particle Board A fire-retardant composition similar to solution No. 9 (Table I), with the following differences was used:
I. The amount of phosphoric acid used was one mole per mole of the combined dicyandiamide and urea.
II. The concentration of the solution was 65.3 percent.

This solution was sprayed on popular flakes having thicknesses of 1/30 inch to ⅛ inch. The amount of solution used was about 23 percent of the oven-dried weight of the flakes. After spraying, the flakes were formed into a mat and pressed in a hydraulic press maintained at 280°F for 10 minutes to obtain a ½ inch particle board of density 46 lbs./ft³. The resulting particle board panels showed a flame spread index of 71 by the 2-foot tunnel method. This compares favourably with the commercial particle board of a similar type which showed a flame spread index of over 100. The internal bond strength of this board as determined by the method of Shen et al. Forest Products J. Vol. 19 pages 17–22 (1969) was 70.4 p.s.i.

From these preliminary results, it is evident that the internal bond strength of the particle board panels prepared by using these solutions as binders meets the C.S.A. standard 6188 (68) requirements which specify a minimum value of 50 lbs/sq. inch for the I.B. strength.

The development of fire retardant particle board presents several critical problems, and one of the most important ones is the adverse effect of the treating chemicals on the binding characteristics of the adhesive resin. This problem could be solved be using these solutions as particle board binders without using any additional fire retardants or conventional adhesives. The other advantages of this approach are: a one pot system, and the elimination of the costly operations of impregnation and subsequent drying of flakes.

EXAMPLE 7

Decay Resistance of Veneers

Birch veneers of thickness 1/26 inch were pressure impregnated with the fire retardant solution No. 4 (Table I) to a retention of 18.9 percent on the oven-dried weight basis of the untreated veneer. These veneers and the untreated controls were cut into approximately ½ inch by 1½ inch strips and these were then tested for their decay inhibiting properties against *Lenzites trabea*, by the following two methods.

a. Agar plate method

*Lenzites trabea* innoculum was placed on the surface of a nutrient medium containing 2 percent malt extract and 2 percent agar at the side of petri plates 9 cm in diameter. Four replicates were made for each of the treated and control veneers. Sterilized glass slides (1 by 3 inches) were then placed upon the agar surface in all of the petri plates.

Moisture contents of the veneer samples were adjusted to approximately 100 percent before placing a strip on each of the glass slides. Veneer strips were not sterilized. When *Lenzites trabea* mycelium reached the edge of the veneer, the strips were removed away from the agar inoculum on the glass slides. Fungal growth was observed for 2 weeks during the incubation period in a room maintained at 27°C and 70 percent relative humidity. The old inocula on the agar media supporting the treated veneers were transferred to fresh malt extract agar to ascertain if the fungus was alive after the incubation period.

b. Test tube method

Veneer strips (of the same size) were placed in test tubes (18 by 150 mm) which contained 0.5 ml distilled water. Some of the treated and control strips were sterilized at 15 p.s.i. for 20 minutes in an autoclave. *Lenzites trabea* inoculum containing no nutrient medium, was placed at the top of each of the veneer strips and incubated under similar conditions as indicated for method (a). Non-inoculated controls were also included in the tests.

No growth of *Lenzites trabea* on the agar supporting the treated veneer samples was observed after an incubation period of 2 weeks. As compared to this, there was a considerable growth of *Lenzites trabea* on the untreated control samples. Furthermore the fungus inoculum which was transferred to the fresh malt agar medium was killed by the diffusion of toxic substances from the treated veneer, indicating fungicidal properties in the fire retardant.

By the end of the 1st week incubation period, no fungal growth was observed on either the sterilized or non-sterilized chemically-treated veneer strips placed in test tubes. All the untreated but inoculated controls supported *L. trabea* growth.

*Lenzites trabea* is a brown rot fungus which causes decay of wood in buildings and under other service conditions. Therefore, considering the above results, the present system appreciably increases the decay resistance of the treated wood products.

A number of criteria necessary for industrial utilization are met by this invention.

Processing or Application Criteria:

The solutions show a wide application latitude e.g.,
  I. Stability (pot-life) of from over 1 month to 1 year or more.
  II. Solids content in solutions from below 20 percent to at least 60 percent concentration.
  III. Viscosity presents no problems in impregnation and adhesive application.
  IV. The estimated raw material cost of one pound of resin solids is approximately 10–13 cents at present rates.
  V. Adaptability to existing wood products plants without major alterations in the existing equipment.

End Use Product Properties:
  I. High degree of leach resistance,
  II. Highly effective flame and glow inhibition.
  III. Non-blooming.
  IV. Decay resistance.

I claim:

1. An aqueous liquid composition comprising an intermediate-stage resin solution formed by reacting:
   a. a urea
   b. dicyandiamide
   c. formaldehyde and
   d. oxy-acid of phosphorus;
in the following relative amounts:
   a. about 1–10 moles
   b. about 1–11 moles
   c. about 1.2–3 moles per mole of (a) plus (b) and
   d. about 0.5–2 moles per mole of (a) plus (b);
which reaction comprises dissolving (a) and (b) in an aqueous solution of (c) having a pH of about 7.5 to 9 and temperature of about 60° to 90°C, cooling to below about 50°C, and slowly adding (d), the solution having present excess or unreacted formaldehyde, acid in amounts sufficient to give an initial pH not significantly above about 3 and having a pot-life of at least about 1 month.

2. The composition of claim 1 wherein the acid of phosphorus is phosphoric.

3. The composition of claim 1 wherein the reactants are present in approximate molar ratios equivalent to:

| | |
|---|---|
| the urea | 1 |
| dicyandiamide | 3 |
| formaldehyde | 8 |
| phosphoric acid | 2 to 6. |

4. The composition of claim 1 wherein the urea compound is selected from urea, thiourea and neutral salts thereof.

5. The composition of claim 1 wherein the solids content is within the range of about 10 to about 70 percent by wt.

6. The composition of claim 1 wherein the mole ratio of the urea to dicyandiamide is about 3 to 1 and the solids content is at least about 40 percent by wt.

7. The method of preparing compositions of the type in claim 1 comprising:
   a. providing an aqueous formaldehyde solution of pH about 7.5 to 9, heated to a temperature of from about 60° to 90°C,
   b. adding the urea and dicyandiamide to this solution and when dissolved,
   c. cooling the resulting solution to below about 50°C and
   d. slowly adding oxy-acid of phosphorus to the cooled solution, thus forming an incompletely-reacted resin solution of prolonged stability.

8. The method of claim 7 wherein water is added to accelerate the cooling step and to adjust the solids content of the final solution.

9. The method of claim 7 including thermosetting the incompletely-reacted resin and removing the water.

10. The method of claim 9 wherein the thermosetting is carried out in or on a substrate.

11. The method of claim 7 wherein step (a) the pH is about 8 and the temperature about 70°–80°C, and in step (c) the solution is cooled below about 35°C.

12. The method of claim 9 wherein a soluble polyfunctional amine or amide, or a catalyst is added shortly before application to accelerate the thermosetting.

* * * * *